United States Patent
Drescher et al.

(10) Patent No.: US 12,303,812 B2
(45) Date of Patent: May 20, 2025

(54) ROTARY PRESSURE FILTER

(71) Applicant: BHS-Sonthofen GmbH, Sonthofen (DE)

(72) Inventors: Frederik Drescher, Sonthofen (DE);
Lukas Elsässer, Ofterschwang (DE);
Wolfgang Süss, Sonthofen (DE);
Steffen Kämmerer, Immenstadt (DE);
Martin Schäfer, Sonthofen (DE)

(73) Assignee: BHS-Sonthofen GmbH, Sonthofen (DE)

( * ) Notice: Subject to any disclaimer, the term of this patent is extended or adjusted under 35 U.S.C. 154(b) by 442 days.

(21) Appl. No.: 17/773,729

(22) PCT Filed: Oct. 31, 2019

(86) PCT No.: PCT/EP2019/079809
§ 371 (c)(1),
(2) Date: May 2, 2022

(87) PCT Pub. No.: WO2021/083522
PCT Pub. Date: May 6, 2021

(65) Prior Publication Data
US 2022/0370935 A1 Nov. 24, 2022

(51) Int. Cl.
*B01D 33/067* (2006.01)
*B01D 33/073* (2006.01)

(52) U.S. Cl.
CPC ......... *B01D 33/067* (2013.01); *B01D 33/073* (2013.01); *B01D 2201/287* (2013.01); *B01D 2201/345* (2013.01); *B01D 2201/347* (2013.01)

(58) Field of Classification Search
CPC ............... B01D 33/067; B01D 33/073; B01D 2201/287; B01D 2201/345; B01D 2201/347; D21C 9/06; D21C 9/02
See application file for complete search history.

(56) References Cited

U.S. PATENT DOCUMENTS

| | | |
|---|---|---|
| 4,182,680 A | 1/1980 | Carle |
| 4,821,536 A | 4/1989 | Bardsley |
| 2005/0051473 A1* | 3/2005 | Suss ...................... B01D 33/09 210/345 |

FOREIGN PATENT DOCUMENTS

| | | |
|---|---|---|
| CN | 1758963 A | 4/2006 |
| CN | 203395178 U | 1/2014 |

(Continued)

OTHER PUBLICATIONS

Chinese Application No. 201980101858.8, Office Action mailed Feb. 3, 2023, 9 pages.

(Continued)

*Primary Examiner* — Waqaas Ali
(74) *Attorney, Agent, or Firm* — Kilpatrick Townsend & Stockton LLP (57) ABSTRACT

A rotary pressure filter suitable for use in treatment of one or more of medical products or foodstuffs, the rotary pressure filter. The rotary pressure filter comprises a filter drum that can be rotated about an axis of rotation. The rotary pressure filter comprises a plurality of filter cells arranged along an outer circumference of the filter drum, with a housing surrounding the filter drum. A process space is formed between the filter drum and the housing. The rotary pressure filter comprises at least one separating element dividing the process space into a plurality of treatment zones. At least one treatment zone is associated with a housing connector via which one or more of fluid or suspension can be introduced into the respective treatment zone.

19 Claims, 6 Drawing Sheets

(56) References Cited

FOREIGN PATENT DOCUMENTS

| | | |
|---|---|---|
| CN | 106573188 A | 4/2017 |
| CN | 209034568 U | 6/2019 |
| DE | 1204628 B | 11/1965 |
| DE | 19654165 C1 | 8/1998 |
| DE | 60007940 T2 | 11/2009 |
| WO | 02100512 A1 | 12/2002 |
| WO | WO-2009135987 A2 * | 11/2009 ............... D21C 9/06 |
| WO | 2017108234 A1 | 6/2017 |

OTHER PUBLICATIONS

International Application No. PCT/EP2019/079809, International Search Report and Written Opinion mailed Jun. 26, 2020, 16 pages.

* cited by examiner

ROTARY PRESSURE FILTER

CROSS REFERENCE TO RELATED APPLICATION

This application is a U.S. national phase of International Patent Application No. PCT/EP2019/079809 filed on Oct. 31, 2019, the entire contents of which are hereby incorporated herein by this reference.

The present invention relates to a rotary pressure filter which is suitable for use in the treatment of medical products and/or foodstuffs, the rotary pressure filter comprising: a filter drum which can be rotated about an axis of rotation, a plurality of filter cells which are arranged along an outer circumference of the filter drum, a housing which surrounds the filter drum, wherein a process space being formed between the filter drum and the housing, and at least one separating element which divides the process space into a plurality of treatment zones, wherein at least one treatment zone being associated with a fluid inlet via which fluid can be introduced into said treatment zone.

The applicant has been selling pressure filters for many years. In such rotary pressure filters, a suspension, which is a mixture of liquid and solids, is applied to a rotating filter drum. The filter drum is designed in such a way that liquid in the suspension can pass through a wall of the filter drum, whereas solids in the suspension remain on a surface of the filter drum. As a result, a layer of solids forms on the surface of the filter drum, which is referred to as "filter cake" in specialist circles.

As the filter drum rotates, the suspension or filter cake passes through various treatment zones, such as washing and drying zones, which are separated from one another in a gas-tight manner by the separating elements. Solids and/or treatment fluid retained by the filter can build up in undercuts and narrow gaps, in particular in the region of seals that seal off the process space.

However, in order to be able to process e.g. food products or pharmaceutical products with a rotary pressure filter, it is imperative that the product to be processed is not contaminated by residues from previously processed products.

It is therefore the object of the present invention to provide a rotary pressure filter by means of which an undesired accumulation of solids and/or treatment fluid can be greatly reduced or even completely prevented.

This object is achieved according to the invention by a rotary pressure filter which is suitable for use in the treatment of medical products and/or foodstuffs, the rotary pressure filter comprising:
a filter drum which can be rotated about an axis of rotation,
a plurality of filter cells which are arranged along an outer circumference of the filter drum,
a housing which surrounds the filter drum, wherein a process space being formed between the filter drum and the housing, and
at least one separating element which divides the process space into a plurality of treatment zones, with at least one treatment zone being associated with a housing connector via which fluid and/or suspension can be introduced into said treatment zone,
wherein the treatment zones are separated from one another such that fluid/suspension is substantially prevented from passing from one treatment zone into a treatment zone which is adjacent according to a rotation of the filter drum,
wherein the at least one separating element is designed to prevent permanent accumulation of fluid in the region of the separating element,
wherein the filter drum is sealed relative to the housing such that fluid/suspension from at least one treatment zone is substantially prevented from exiting the corresponding treatment zone other than through filter cells located in the treatment zone, and such that permanent accumulation of fluid/suspension in the region of a transition between the filter drum and the housing is prevented,
wherein the seal between the filter drum and the housing comprises a resilient hollow element which can be filled with a fluid and which is designed to close a gap between said hollow element and the housing by filling the hollow element, and/or
wherein a resilient hollow element which can be filled with a fluid is arranged adjacent to at least one of the separating elements, in particular to all of the separating elements, in a direction parallel to the axis of rotation of the filter drum, in particular on both sides, which hollow element is designed to close a gap between said hollow element and the separating element by filling the hollow element.

The expression "that fluid/suspension from at least one treatment zone is substantially prevented from exiting the corresponding treatment zone other than through filter cells located in the treatment zone" is intended to refer in particular to those treatment zones in which the filter cake is formed or treated. In addition, however, there can also be treatment zones in which treatment fluid is introduced into the treatment zone radially from the outside and also leaves it again radially towards the outside, for example drying air in drying zones. Furthermore, a cleaning zone can be provided in which a treatment fluid is conducted radially from the inside through the filter cell then radially towards the outside, for example in order to clean the filter cloth. In general, the expression mentioned above is thus intended to mean that fluid or suspension should be prevented from exiting a treatment zone at points which have not been designated for fluid/suspension exit. This mostly applies to fluid/suspension exiting a treatment zone in direction of rotation of the filter drum and/or in axial direction of the axis of rotation of the filter drum.

The hollow elements can e.g. be designed to be filled with a gas, for example air, from a source connected thereto.

By filling the hollow elements, a gap which axially adjoins the process space and/or a separating element can be closed in such a way that a build-up of solids or treatment fluid is prevented. For instance, in the case of separating elements on which a pressure chamber via which the separating elements can be displaced in direction of the filter drum is arranged on a radially outer side with respect to the filter drum, foreign matter can be prevented from entering this pressure chamber.

Due to a flexible design of the hollow element, it can be placed almost arbitrarily against a corresponding counter surface so that a gap to be closed can be reliably closed. In addition, a control unit can be connected to at least one hollow element and is designed to detect a pressure drop in the hollow element and to automatically initiate a corresponding supply of fluid into the hollow element.

"Accumulation" or "build-up" here means in particular that solids and/or treatment fluid which have entered a corresponding gap cannot be removed in the sense of an exchange in a self-cleaning manner.

In order to achieve this self-cleaning effect in those gaps which cannot be avoided by design, such gaps, in particular with a gap size from 0.5 mm, and associated radii, in particular with a radius from 5 mm, can be formed in the rotary pressure filter according to the invention.

Advantageously, a sealing strip can be associated with a hollow element and can be arranged adjacent to it at the gap to be closed, wherein the sealing strip can advantageously comprise a PTFE material. By using a sealing strip, the sealing strip can assume the function of fitting against a counter surface and thus sealing the gap, so that the hollow element can primarily have the function of applying force. As a result, the hollow element can also be very thin-walled.

It has been found that a sealing strip comprising PTFE can have both good sealing properties and, in the case of sealing with respect to a relatively moving element, for example the rotation of the filter drum relative to the housing, good sliding properties.

In order to be able to ensure cleaning of all surfaces of the interior of the housing, a cleaning rail rotating together with the filter drum can be provided thereon, along which cleaning rail a plurality of nozzles, for example flat jet nozzles, are arranged. This cleaning rail can be specially designed to clean the interior of the housing of the rotary pressure filter. In order to clean the filter drum and filter cells or filter units arranged therein, at least one further cleaning rail having a row of nozzles can be arranged in at least one corresponding treatment zone of the housing. This cleaning rail(s) is/are stationary, in particular relative to the filter housing. In the case of a plurality of cleaning rails, the number of nozzles in a second row can be increased compared to a first row in order to reach every point of the filter drum with sufficient cleaning performance. Furthermore, drain holes via which the supplied cleaning fluid can be discharged can be arranged in treatment zones. In this case, the drain holes can be opened only for a washing process, for example between the treatment of two different products, and can be closed, in particular automatically closed, for a product treatment operation.

Advantageously, the nozzles, at least of the cleaning rail rotating together with the filter drum, in particular of all cleaning rails, can be designed so as to be flush with an outer circumference of a component in which the nozzles are arranged. There is a risk of product building up in edges and undercuts both in the case of nozzles protruding from the component and those sunk into the component. A flush design can prevent product build-up.

Furthermore, a sliding element can be associated with a hollow element and is arranged between the hollow element, adjacent to it, and a component of the rotary pressure filter, in particular the filter drum, that can be displaced relative to said hollow element. This sliding element can in particular be an element which is separate from the sealing strip and which can be arranged on a different side of the hollow element than the sealing strip.

In this case, the sliding element can be secured to a same component to which the hollow element is also secured. If, for example, the hollow element is connected to the housing through which e.g. a fluid line connected to the hollow element passes, the sliding element can also be connected to the housing so that a relative displacement between the sliding element and the hollow element can be prevented.

Advantageously, at least one of the hollow element, the sealing strip and the sliding element can be annular. In this way, a sealing strip, a hollow element and a sliding element, the annular formation of which extends in the circumferential direction of the filter drum, can in each case be arranged at each longitudinal end of the filter drum. In particular, a plurality of fluid lines can be associated with an annular hollow element, via which lines fluid can be conducted into or out of the hollow element in order to inflate or deflate it.

At least one of the hollow element, the sealing strip and the sliding element can be arranged substantially concentrically to the axis of rotation of the filter drum.

In particular, the components that form the seal between the filter drum and the housing can also be the components that form the seal between the separating elements and the housing. Thus, it is conceivable for an annular hollow element, for example in combination with an annular sealing strip and an annular sliding element, to provide a seal between a separating element and the housing on a first portion and a seal between the filter drum and the housing on a second portion. In addition, a single hollow element, possibly in combination with a sealing strip and/or a sliding element, can also form all the seals between the separating elements of the rotary pressure filter and the housing on the same side.

The rotary pressure filter can further comprise a control head which is arranged radially inwards relative to the filter drum, and via which fluid which has passed through the filter cells in a particular treatment zone leaves the rotary pressure filter, the control head being divided by control head separating elements into a plurality of discharge zones which abut the filter drum and the control head in such a way that the discharge zones are fluidically sealed with respect to one another, wherein a hollow element which can be filled with a fluid being arranged in a direction parallel to the axis of rotation of the filter drum, in particular on both sides, with respect to one control head separating element, in particular all the control head separating elements, which hollow element is designed to close a gap between said hollow element and the control head separating element by filling the hollow element.

It should be noted at this point that the above-mentioned features, advantages and properties which have been described in relation to the above-mentioned hollow elements can also be applied to the hollow element which is associated with a control head separating element. Thus, by using a corresponding hollow element, a control head separating element can be sealed, in particular axially, with respect to the axis of rotation of the filter drum.

Here, too, a sealing strip and/or sliding element can be associated with the hollow element(s) adjacent to a control head separating element and can be arranged adjacent to the hollow element at the gap to be closed, with reference being made in this regard to the sealing strip/sliding element described above.

In a development of the present invention, a filter unit can be arranged in a filter cell, in particular each filter cell, which filter unit carries a filter cloth which is designed, from a suspension to be filtered which reaches the filter cloth, to retain solids above a size defined by the filter cloth and to allow fluids to pass through, the filter cloth and a frame of the filter unit being produced as separate components and being interconnected using a joining process, in particular a thermal joining process, for example one of a welding process and an ultrasonic welding process, or the filter cloth and the frame being produced together in one piece, in particular using a 3D printing process. By connecting the filter cloth directly to the frame of the filter unit, a cord, as used in conventional filter units to fasten the filter cloth to the frame, can be dispensed with, which in turn prevents gaps, caused by the use of the cord, in which product can accumulate. In particular, the filter cloth can be connected to the frame in such a way that a side of the filter cloth on which a filter cake builds up is substantially flush with an adjacent surface of the frame of the filter unit. A corresponding weld seam can thus extend substantially in one plane or in a surface curved about a spatial axis.

An ultrasonic welding process can be used in particular when using plastics materials for the filter unit, i.e. the frame and/or the filter cloth, such as PP/PVDF.

Furthermore, a so-called "second containment" can be provided for bearing shields and on a control head of the rotary pressure filter, via which a possible leakage of hazardous substances can be additionally prevented for reasons of occupational safety by implementing an additional seal outwardly on said components. This second containment can in particular be arranged outside, preferably coaxially to, a stuffing box gland of the filter drum. The second containment can be connected to the housing via those fastening elements, for example threaded bolts, by means of which the stuffing box gland of the filter drum is also attached to the housing. The second containment advantageously has at least one radial shaft sealing ring which is designed to contact the filter drum in order to provide a further seal.

Advantageously, the filter unit can have a seal that extends at least partially around the frame of the filter cell and is designed to seal a gap between a filter cell and a filter unit arranged therein, wherein the seal can comprise in particular an elastomer material. The seal, which can be designed for example as a sealing cord with a round profile, can be deformed in the assembled state of the filter unit in a relevant filter cell to such an extent that the seal completely closes a gap between the filter unit and the filter cell, i.e. the seal, which is circumferentially arranged on the frame of the filter unit, is deformed in such a way that it is substantially level with an associated filter cloth in a direction radial to the axis of rotation of the filter drum. In this way, the gap and/or undercuts between the filter unit and filter cell or filter cell wall can be closed in such a way that product that has accumulated there, in particular solids, can be reliably removed when the filter cell is cleaned.

In order to cause the deformation of the seal of the filter unit, the filter unit can be screwed to the filter drum, in particular using stud bolts which engage in the filter unit from a radially inner side of the filter drum through a transformation of the filter drum. Furthermore, a chamfer can be formed on a filter cell base abutted by the seal of the filter unit, which chamfer promotes a deformation of the seal radially outwards in relation to the filter drum. In order to be able to reduce a space in the filter cell above the filter cloth, i.e. a space in which a filter cake builds up, cell supports can be arranged between the filter unit and the filter cell base. The cell supports can have a chamfer to support the deformation of the seal in a manner analogous to the filter cell base.

A further seal can be arranged between the filter unit and the filter cell base so as to surround a fluid drain line through the filter unit so that so that fluid from the drain line cannot enter a gap between the filter unit and the filter cell base.

In particular, the filter unit can be designed to be removable from the filter cell. Defective filter units, which e.g. have a damaged filter cloth, can thus be replaced in a simple manner.

Furthermore, housing connectors which are connected to the housing and via which suspension and/or fluid can be introduced or removed from the process space can be welded to the housing. This can prevent grooves in which deposits can take place.

In general, it can be advantageous for a hygienic design of the rotary pressure filter according to the invention if all surfaces that can come into contact with the suspension/treatment fluid have radii of at least 5 mm and a maximum surface roughness of Rz4 (µm).

Hereinafter, the present invention will be described in greater detail using an embodiment with reference to the accompanying drawings, in which.

Figure 1:
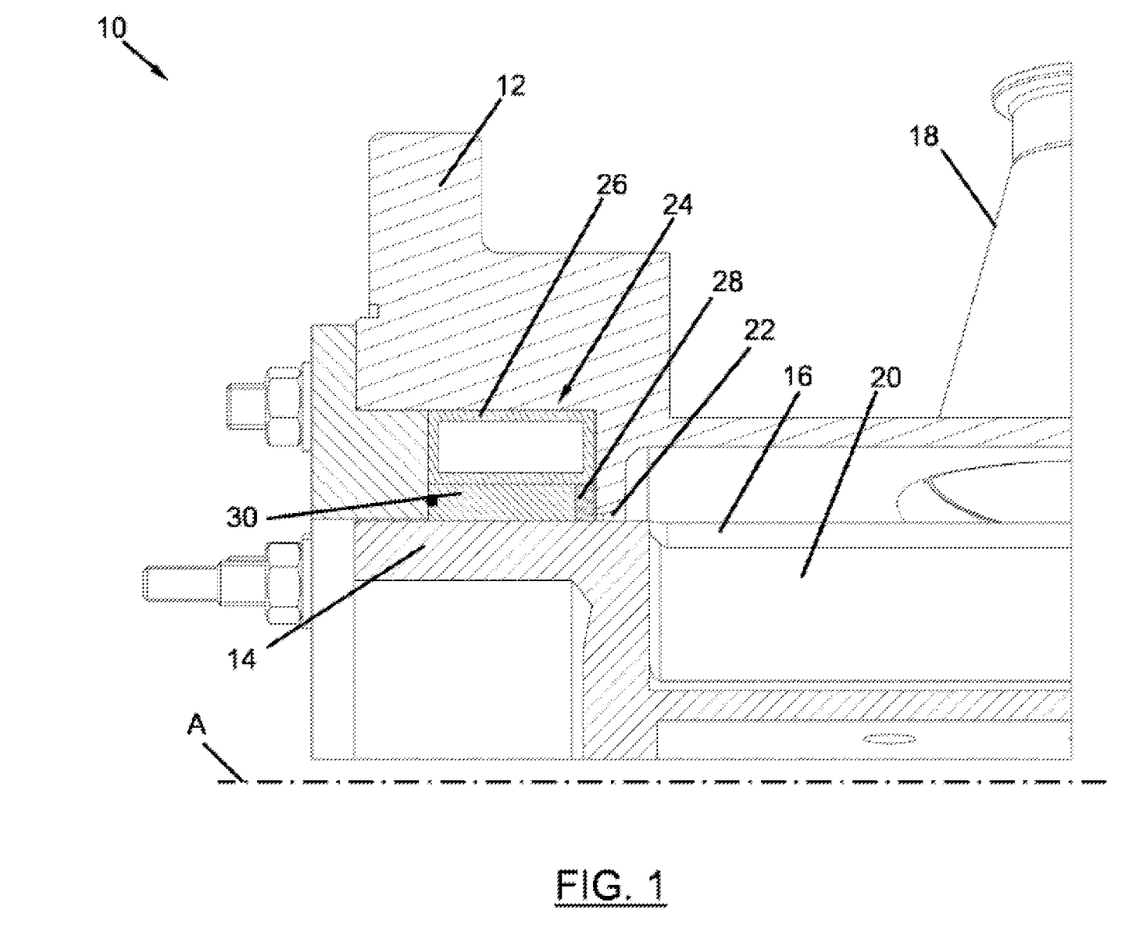
FIG. 1 shows a detail of a side cross-section of a rotary pressure filter according to the invention in the region of a housing of the rotary pressure filter.

In FIG. 1, a rotary pressure filter according to the invention is generally denoted with reference sign 10. The rotary pressure filter 10 comprises a housing 12 and a filter drum 14 arranged therein which rotates about an axis of rotation A. A process space 16 into which suspension to be filtered can be introduced via a housing connector 18 is arranged between the housing 12 and the filter drum 14. The suspension is divided into liquid and solid components in a filter cell 20 of the filter drum 14, with the liquid components of the suspension leaving the filter cell 20 radially inwards in relation to the filter drum 14 and solid components being retained in the filter cell 20. In a treatment zone downstream of the introduction of suspension into the process space 16, the components of the suspension remaining in a particular filter cell 20 can also be treated with treatment fluids, such as washing liquids or drying air, and then discharged.

In order to prevent suspension and/or treatment fluid from accumulating permanently, i.e. in such a way that it cannot be reliably removed by cleaning the filter cell, for example at the end of a treatment cycle or at the latest during cleaning before changing to a different product to be treated, a seal 24 is associated with the process space 16 or a gap 22 by which the process space 16 is reduced at its axial end, in a direction axial to the axis of rotation A. In the embodiment shown in FIG. 1, the seal 24 comprises a hollow element 26 which can be filled with fluid via a fluid line (not shown) in order to be inflated, i.e. to increase in volume, or from which fluid can be discharged from the hollow element 26 via the fluid line can so that the hollow element 26 decreases in volume.

Adjacent to the hollow element 26 and inserted between the hollow element 26 and the process space 16 is a sealing strip 28 disposed which is suitable for sealing the process space 16 from an outer side in such a way that no product or treatment fluid can escape from the process space 16 at this point.

Since the hollow element 26 is fastened to the housing 12 in the embodiment shown in FIG. 1, a sliding element 30 which is in sliding contact with the filter drum 14 is also arranged between the hollow element 26 and the filter drum 14. The sliding element 30 is also attached to the housing 12.

Figure 2:
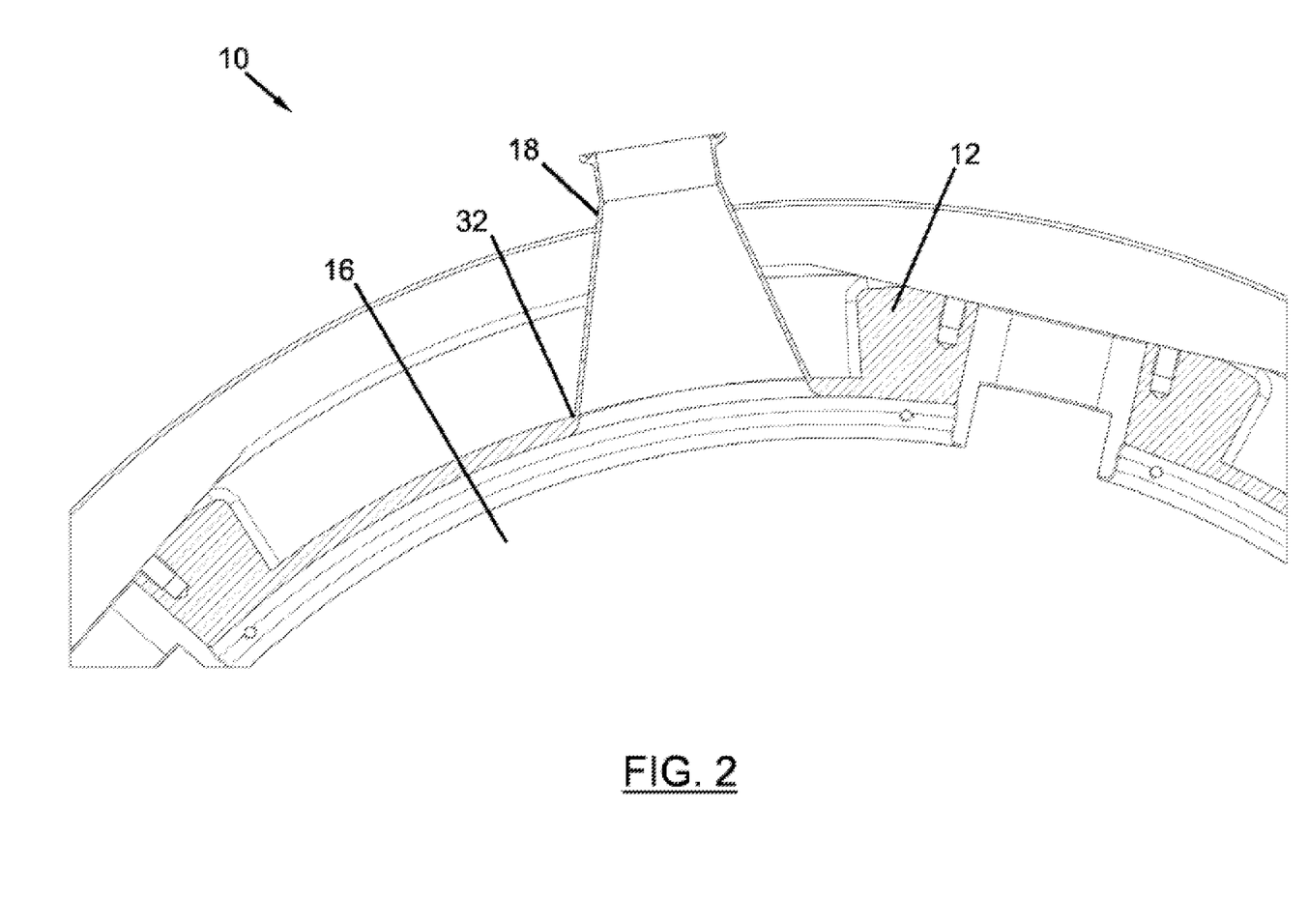
FIG. 2 shows a further detail of a side cross-section of the rotary pressure filter according to the invention in the region of the housing of the rotary pressure filter.

FIG. 2 shows, in a side cross-sectional view, how the housing connector 18 is connected to the housing 12 in the embodiment shown without any sharp transitions or undercuts occurring. In the example shown, the housing connector 18 is integrally bonded to the housing 12, for example by a welding process. A transition 32 between the housing 12 and the housing connector 18 therefore has a smooth course, forming a radius from a side of the housing 12 facing the process space 16 to an inside of the housing connector 18.

Figure 3:
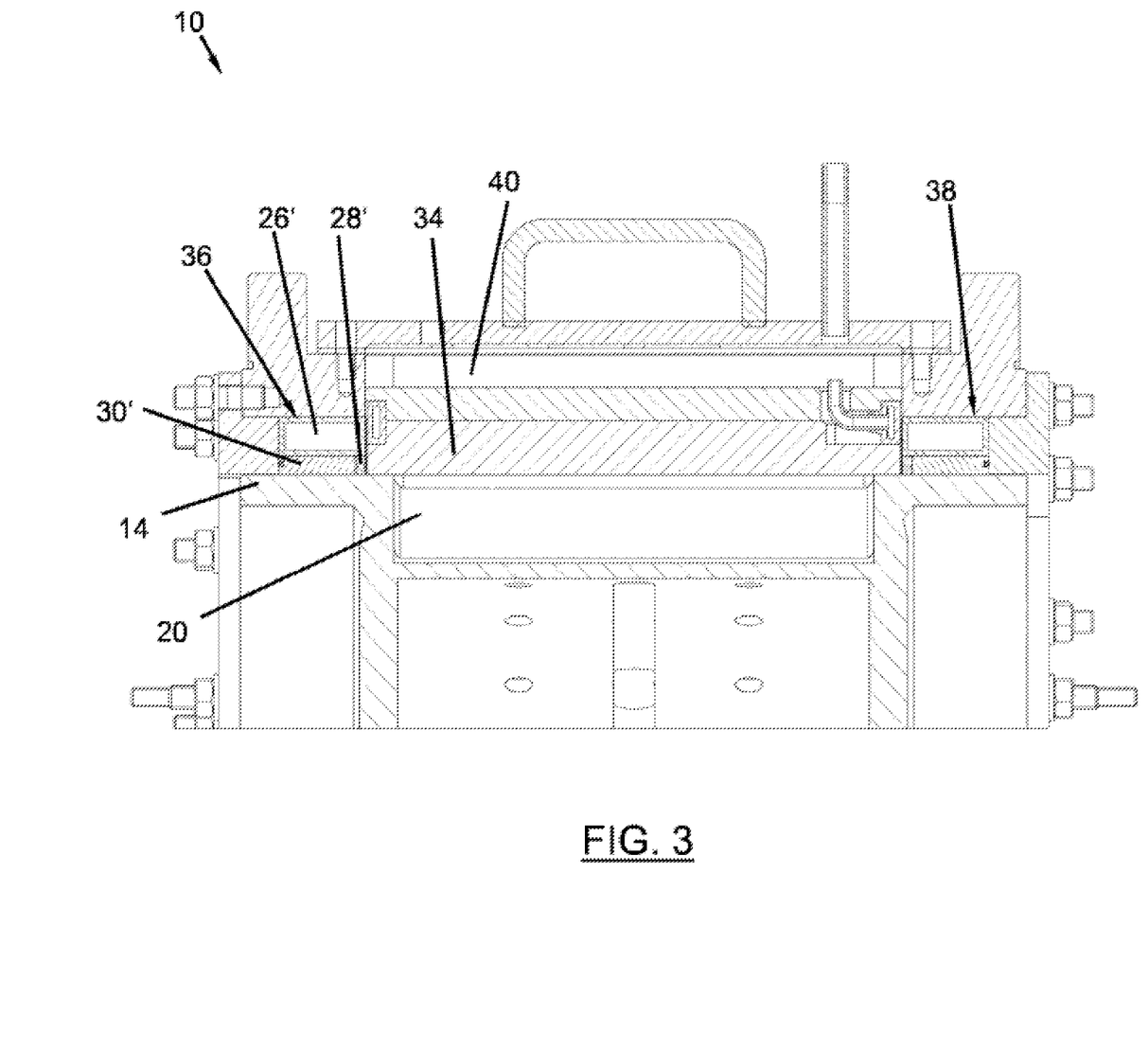
FIG. 3 shows a further detail of a side cross-section of the rotary pressure filter according to the invention in the region of the housing of the rotary pressure filter.

FIG. 3 shows the rotary pressure filter 10 according to the invention in a sectional view, the sectional plane of which extends through a separating element 34 which separates two treatment zones which are adjacent in the direction of rotation of the filter drum 14 in a gas-tight manner. Analogously to the seal 24 of the process space 16 described with reference to FIG. 1, i.e. between the housing 12 and the filter drum 14, there is also a seal 36 and 38 at each of the two longitudinal ends, in relation to the axis of rotation A of the filter drum 14, of the separating element 34, each of which comprises a hollow element 26', a sealing strip 28' and a sliding element 30'. On the one hand, the seals 36 and 38 prevent foreign matter from migrating axially outwards along a contact surface between the separating element 34 and the filter drum 14 and, on the other hand, prevent foreign matter from passing out of the filter cell 20 into a pressure chamber 40 which is arranged in a radial direction outside the separating element 34 and via which contact pressure from the separating element 34 can be exerted on the filter drum 14.

In a particular embodiment, the seal 24 and the seal 36 can be formed from the same components, i.e. from the hollow element 26, the sealing strip 28 and the sliding element 30. The same naturally applies to a seal 38, although an associated seal opposite the seal 24 is not shown in FIG. 1.

Figure 4:
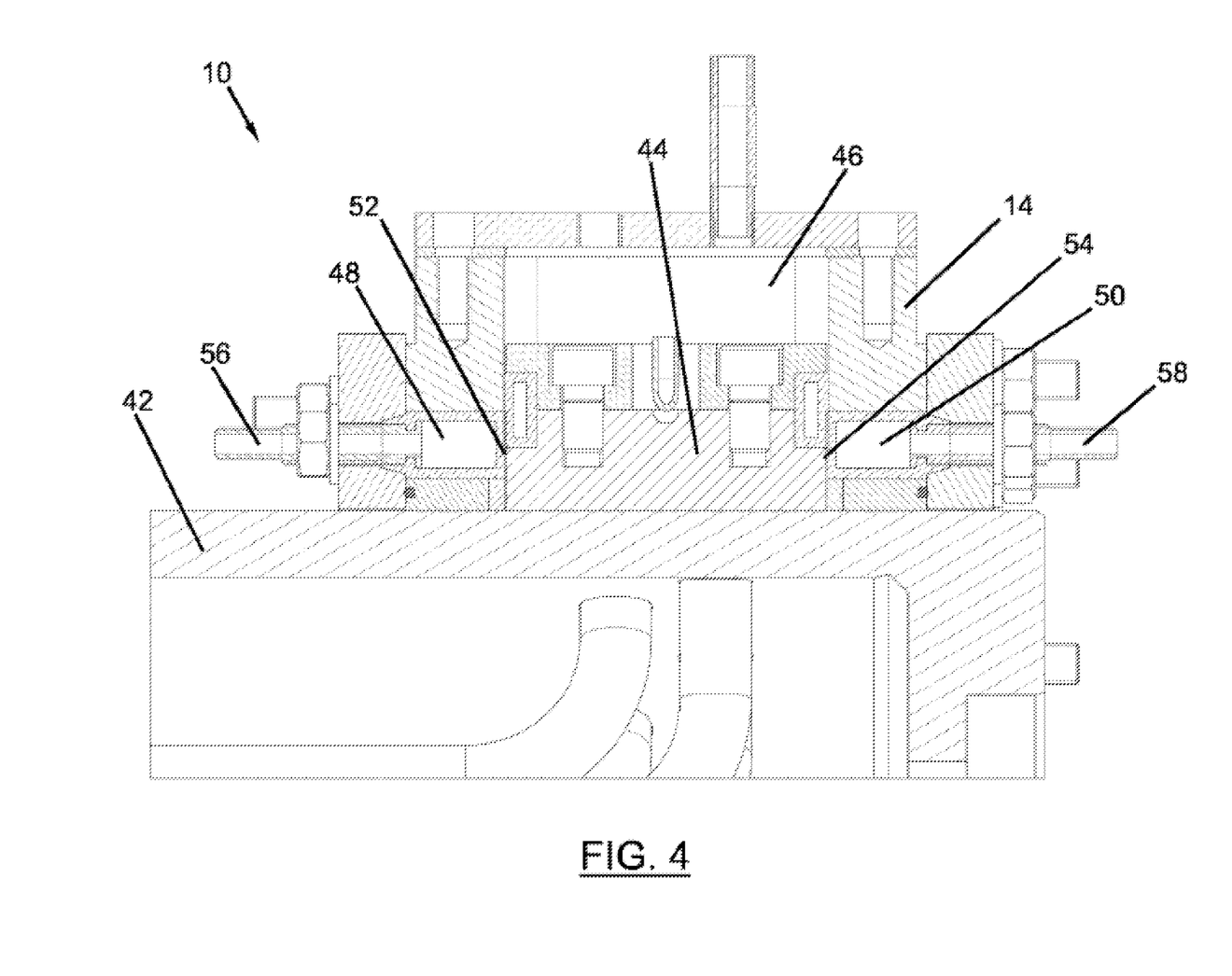
FIG. 4 shows a detail of a side cross-section of the rotary pressure filter according to the invention in the region of a control head of the rotary pressure filter.

Liquid components of the suspension as well as treatment fluids which have passed radially inwards through the filter cell 20 on the filter drum 18 are guided out of the rotary pressure filter 10 via a control head 42. It can be advantageous to divide the control head 42 into discharge zones, at least partially analogously to the division of the process space 16 into treatment zones. The discharge zones are separated by control head separating elements 44.

In the embodiment shown, in contrast with the separating elements 34, the control head separating elements 44 are rigidly connected to the filter drum 14 so that they rotate with it about the control head 42. It can be seen in FIG. 4 that, above the control head separating elements 44, i.e. radially inwards in relation to the axis of rotation A, a control head pressure chamber 46 is arranged which, analogously to the pressure chamber 40, can be filled with fluid in such a way that the control head separating elements 44 can be subjected to a corresponding contact pressure on the control head 42. In order to be able to prevent foreign matter from accumulating at the ends of a particular control head separating element 44 that are axial in relation to the axis of rotation A, hollow elements 48 and 50 which can close a relevant gap 52 and 54 are provided on these longitudinal ends of the control head separating element 44. Fluid lines 56 and 58 via which the hollow elements 48 and 50 can be filled and drained can also be seen in FIG. 4. In the embodiment shown, the fluid lines 56 and 58 are designed as centrally drilled threaded bolts.

Figure 5:
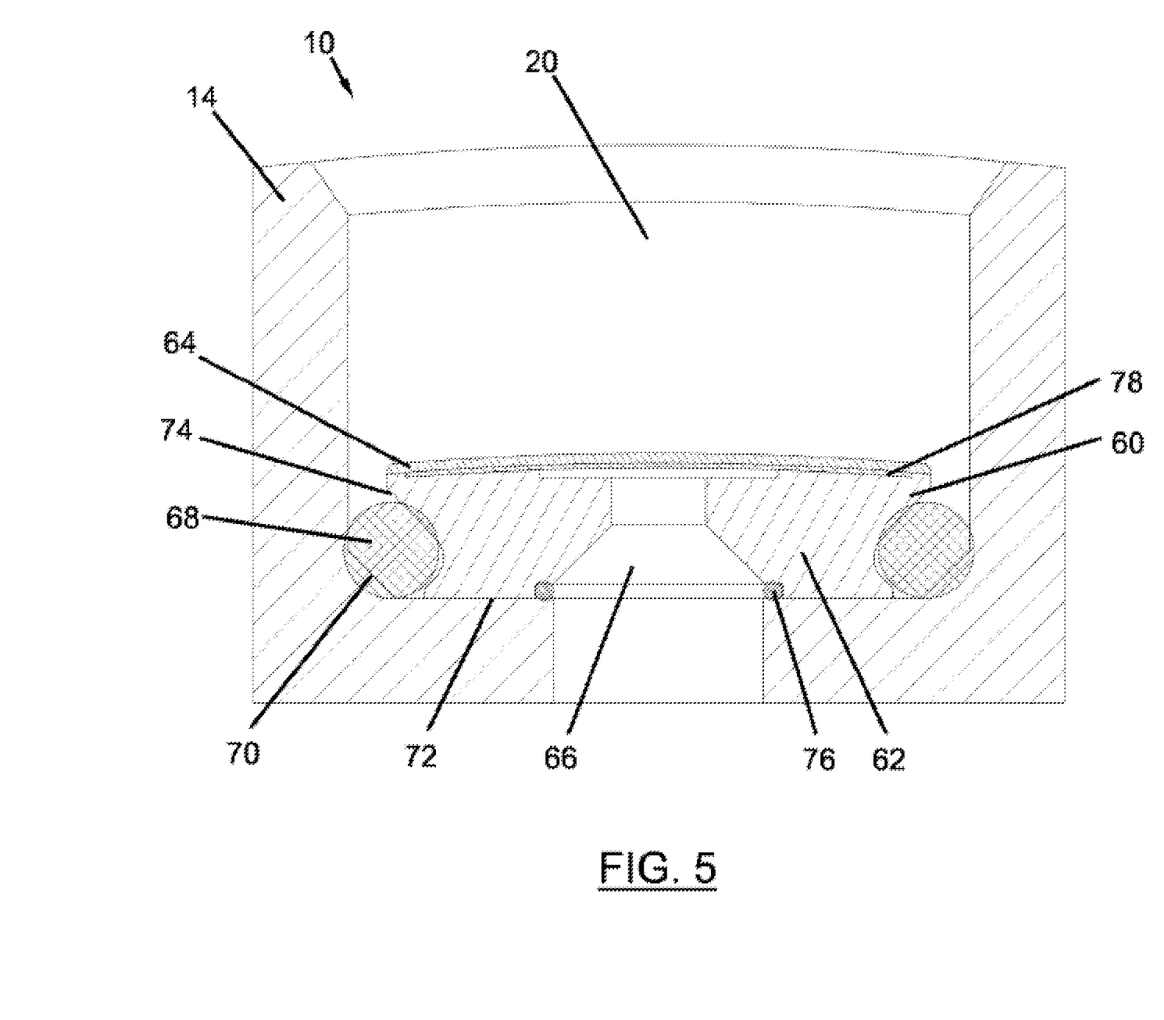
FIG. 5 shows a side cross-section of a filter cell of the rotary pressure filter according to the invention.

FIG. 5 shows a detail of the rotary pressure filter 10 according to the invention, which shows a filter cell 20 of the filter drum 14. A filter unit 60 is arranged in the filter cell 20 and comprises a frame 62 and a filter cloth 64 arranged on the frame 62 of the filter unit 60. The filter cloth 64 is flush with a surrounding edge of the frame 62 of the filter unit 60 and forms a curved surface therewith in the circumferential direction of the filter drum 14.

A drain line 66 is provided in an interior of the frame 62, via which drain line liquid components of the suspension and treatment fluids that have passed through the filter cloth 64 can leave the filter cell 20 in direction of the control head 42. A seal 68 in the form of a sealing cord is arranged circumferentially around the frame 62 of the filter cell 60. In FIG. 5, the seal 68 is shown uncompressed. In reality, however, the seal 68 would be deformed by a chamfer 70, formed on a filter cell base 72 of the filter cell 20, and a contact surface 74 of the frame 62 of the filter unit 60 such that the seal 68 also substantially reaches the level of the curved surface of the filter cloth 64 and the surrounding edge of the frame 62.

The drain line 66 can advantageously be surrounded by a further seal 76 between filter cell base 72 and frame 62.

In the embodiment shown, a supporting fabric 78 is arranged under the filter cloth 64 and is used to provide the filter cloth 64 with a large contact surface or to prevent the filter cloth 64 from sagging into the frame 62 of the filter cell 60. The supporting fabric 78 is sunk into the frame 62 so that the filter cloth 64 can extend as far as an outer edge of the frame 62 without a step between the frame 62 and the supporting fabric 78 interfering with the course of the filter cloth 64.

Figure 6:
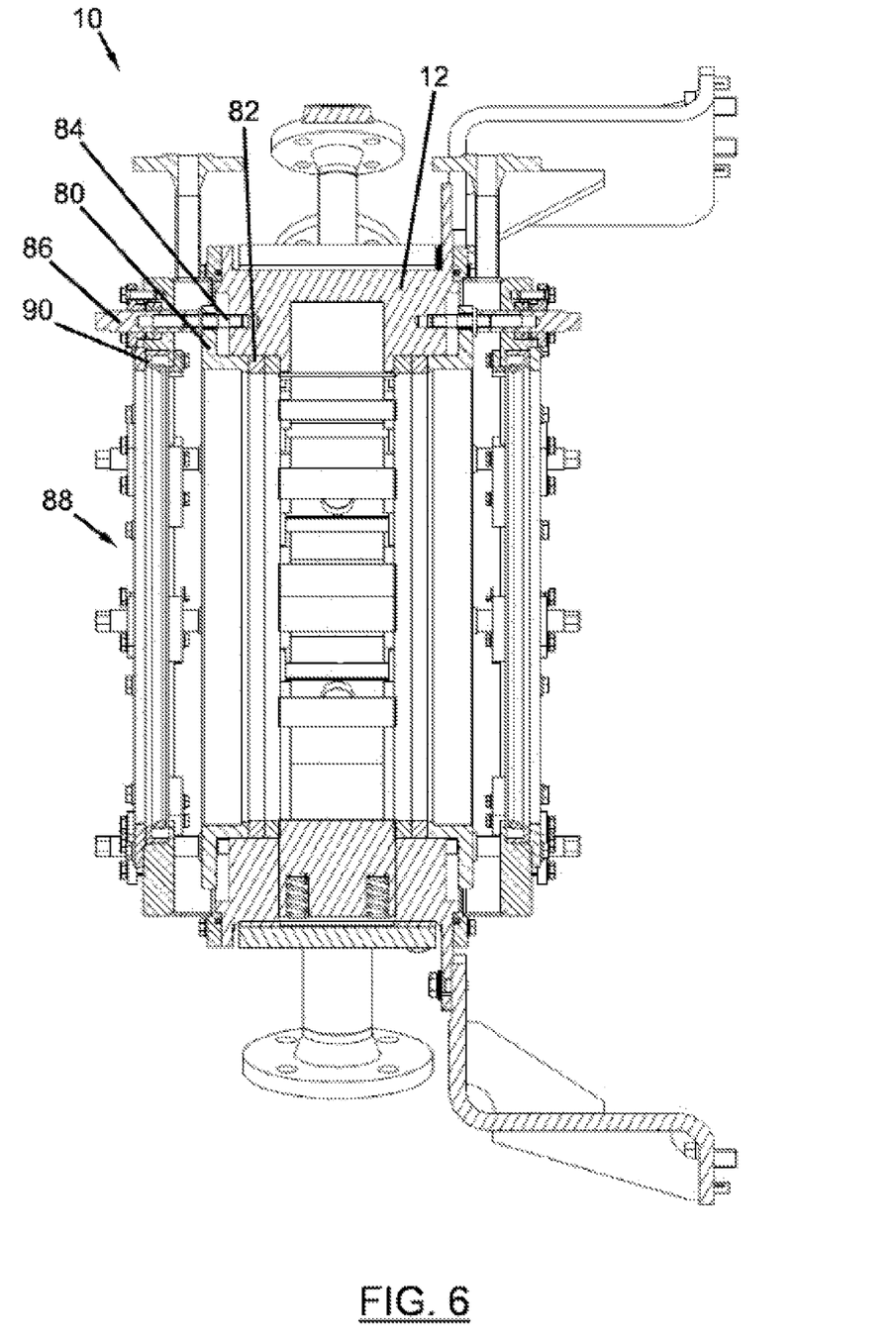
FIG. 6 shows a side cross-sectional view of the rotary pressure filter according to the invention without a filter drum.

FIG. 6 shows a side cross-sectional view of a rotary pressure filter 10 according to the invention. The filter drum 14 is not shown in FIG. 6. It can be seen here that the housing 12 of the rotary pressure filter 10 is connected to a stuffing box gland 80 which presses a stuffing box packing 82 against the housing 12 in such a way that the stuffing box packing 82 is deformed radially inwards in order to form a seal with respect to the filter drum 14. The stuffing box gland 80 is connected to the housing 12 via threaded bolts 84.

A nut 86 via which a second containment 88 is fastened to the housing 12 of the rotary pressure filter 10 is connected at an end of a relevant threaded bolt 84 that is opposite the housing 12. The second containment 88 comprises a radial shaft sealing ring 90 which comes into contact with the filter drum 14. In this way, in addition to the stuffing box packing 82, a further seal with respect to an outer side of the rotary pressure filter 10 is provided.

The invention claimed is:

1. A rotary pressure filter suitable for use in treatment of medical products or foodstuffs, the rotary pressure filter comprising:
   a filter drum that can be rotated about an axis of rotation;
   a plurality of filter cells arranged along an outer circumference of the filter drum;
   a housing surrounding the filter drum, wherein a process space is formed between the filter drum and the housing; and
   at least one separating element dividing the process space into a plurality of treatment zones, wherein at least one treatment zone is associated with a housing connector via which one or more of a fluid or a suspension can be introduced into the respective treatment zone,
   wherein at least one separating element separates the treatment zones from one another in a gas-tight manner,
   wherein the at least one separating element is configured to prevent a permanent accumulation of fluid in a region of the separating element,
   wherein the filter drum is sealed relative to the housing such that the one or more of the fluid or the suspension from at least one treatment zone is substantially prevented from exiting the at least one treatment zone other than through filter cells located in the treatment zone, and such that a permanent accumulation of the one or more of fluid or suspension in a region of a transition between filter drum and the housing is prevented, and wherein a hollow element which can be filled with a second fluid is arranged adjacent to at least one of the separating elements in a direction parallel to the axis of rotation of the filter drum, wherein the hollow element is designed to close a gap between said hollow element and the separating element by filling the hollow element.

2. The rotary pressure filter of claim 1, wherein a sealing strip is arranged adjacent to the hollow element at the gap, wherein the sealing strip comprises a polytetrafluoroethylene (PTFE) material.

3. The rotary pressure filter of claim 1, wherein a cleaning rail is provided on the filter drum such that the cleaning rail rotates together with the filter drum and wherein a plurality of nozzles are arranged along the cleaning rail.

4. The rotary pressure filter of claim 2, wherein a sliding element is arranged between the hollow element and a component of the rotary pressure filter that can be displaced relative to said hollow element.

5. The rotary pressure filter of claim 4, wherein the sliding element is secured to a same component to which the hollow element is also secured.

6. The rotary pressure filter of claim 4, wherein at least one of the hollow element, the sealing strip, and the sliding element is annular.

7. The rotary pressure filter of claim 4, wherein the component of the rotary pressure filter comprises the filter drum.

8. The rotary pressure filter of claim 6, wherein at least one of the hollow element, the sealing strip, and the sliding element is arranged concentrically to the axis of rotation of the filter drum.

9. The rotary pressure filter of claim 1, wherein components that form the seal between the filter drum and the housing are also the components that form a seal between the separating elements and the housing.

10. The rotary pressure filter of claim 1, wherein the rotary pressure filter further comprises a control head arranged radially inwards relative to the filter drum and via which the fluid which has passed through the filter cells in a particular treatment zone leaves the rotary pressure filter, wherein the control head is divided by control head separating elements into a plurality of discharge zones, the plurality of discharge zones abutting the filter drum and the control head such that the discharge zones are fluidically sealed with respect to one another, wherein a second hollow element that can be filled with a third fluid is arranged in a direction parallel to the axis of rotation of the filter drum with respect to one of the control head separating elements, wherein the second hollow element is designed to close a gap between the hollow element and the one of the control head separating elements by filling the second hollow element with the third fluid.

11. The rotary pressure filter of claim 10, wherein a sealing strip is associated with the second hollow element adjacent to the one of the control head separating elements, wherein the sealing strip is arranged adjacent to the second hollow element at the gap between the second hollow element and the one of the control head separating elements.

12. The rotary pressure filter of claim 10, further comprising a second containment, on the control head of the rotary pressure filter, for bearing shields.

13. The rotary pressure filter of claim 10, wherein the second hollow element is arranged in a direction parallel to the axis of rotation of the filter drum with respect to all of the control head separating elements.

14. The rotary pressure filter of claim 1, wherein a filter unit is arranged in a filter cell wherein the filter unit carries a filter cloth designed to retain, from the suspension to be filtered which reaches the filter cloth, solids above a size defined by the filter cloth and to allow the fluids to pass through, the filter cloth and a frame of the filter unit being one or more of (A) produced as separate components and being interconnected using a joining process or (B) produced together in one piece.

15. The rotary pressure filter of claim 14, wherein the filter unit comprises a seal extending at least partially around the frame of the filter cell, wherein the seal extending at least partially around the frame is configured to seal a gap between the filter cell and the filter unit arranged therein.

16. The rotary pressure filter of claim 15, wherein the seal extending at least partially around the frame comprises an elastomer material.

17. The rotary pressure filter of claim 14, wherein the filter unit is removable from the filter cell.

18. The rotary pressure filter of claim 1, further comprising housing connectors connected to and welded to the housing, wherein the one or more of the suspension or the fluid can be introduced into or removed from the process space via the housing connectors.

19. The rotary pressure filter of claim 1, wherein the hollow element is arranged adjacent to all of the separating elements.

* * * * *